Oct. 11, 1960

M. J. WILLETTE 2,955,435

CONTROL APPARATUS

Filed June 25, 1956

INVENTOR.
MERTON J. WILLETTE

BY Joseph E. Ryan

ATTORNEY

Oct. 11, 1960

M. J. WILLETTE
CONTROL APPARATUS 2,955,435

Filed June 25, 1956

INVENTOR.
MERTON J. WILLETTE

BY

*Joseph E Ryan*

ATTORNEY

United States Patent Office 2,955,435
Patented Oct. 11, 1960

2,955,435

CONTROL APPARATUS

Merton J. Willette, Minneapolis, Minn., assignor to Minneapolis-Honeywell Regulator Company, Minneapolis, Minn., a corporation of Delaware Filed June 25, 1956, Ser. No. 593,525

5 Claims. (Cl. 62—161)

The present invention is concerned with an improved air conditioning control system, in particular in a control system having an overload or safety control for the air conditioning refrigeration apparatus which is restored to operation or reset when the fan controller is de-energized; however, operation of the refrigeration apparatus cannot exist without operation of the fan.

In the modern day air conditioning installations, especially those adapted for use in domestic residence, there is a need for a complete automatic control cystem and yet simplicity and low cost are of the utmost importance to meet the present day competitive market. In an air conditioning system using refrigeration apparatus it is conventional to have safety means such as pressure cutout switches responsive to both high and low refrigerant pressures and overload switches responsive to excessive current demands by the refrigeration apparatus motor. Upon the occurrence of such abnormal conditions the refrigeration apparatus is shut down as a safety precaution. Circuits for controlling such apparatus and providing the safety feature are commonly known as "reset circuits" and generally comprise a holding circuit in which the responsive means are connected so that should the holding circuit be broken, the control is de-energized and only can be restored to operation by closing the holding circuit. The switch for restoring such a holding circuit is commonly known as a "reset switch" and is generally indicated on a control panel as "reset." When the reset circuit is restored to operation it provides for a circuit connection between the control relay for the refrigeration apparatus and the main control, such as a room thermostat. Thus normal operation of the refrigeration apparatus exists as long as the operating conditions to which the aforementioned responsive means respond are within the safe limits. Generally in most "reset circuits" it has been common practice to require manual depression of a "reset" button to re-establish operation after a power failure. To have a restoration of the reset circuit after a power failure requires complicated circuitry which is quite expensive.

Very recently in the prior art an improved "reset circuit" for air conditioning apparatus was developed, as shown in the co-pending Ritter et al. application Serial No. 592,906, filed June 21, 1956, now Patent No. 2,884,-767. A contact on a fan relay, which is normally closed when the fan relay is de-energized, is connected into the reset circuit and replaces the reset switch. Thus to obtain the resetting action for the safety control of the refrigeration apparatus, the fan relay, which controls the fan of the air conditioning apparatus, is deenergized by its associated control circuit. With such an improved arrangement, it is possible to have a remote switch, such as on the space thermostat, in a circuit which would have the common use for controlling the fan as well as the reset operation. A further advantage of this arrangement is that the reset circuit is restored to its normal operating condition upon power restoration after a power failure.

The present invention is an improvement over the aforementioned invention as operation of the refrigeration apparatus, when the reset circuit is established, cannot exist with the fan relay de-energized. The present invention connects the refrigeration control relay in series with a switch which is open when the fan relay is de-energized so that even when the reset circuit is in its normal restored condition, operation of the refrigeration apparatus cannot exist without operation of the fan. Furthermore the present inventor improved the prior art by providing a circuit in which the reset circuit need not be energized during the heating period and is restored to its operative and energized condition when a manual selector switch is returned to the position for cooling.

It is therefore an object of the present invention to provide an improved air conditioning control system;

It is another object of the present invention to provide in an air conditioning control system for operation of a medium cooling apparatus only when the circulating apparatus for the cooled medium is in operation;

It is still another object of the present invention to provide in a refrigeration control system having safety and overload apparatus for operation of the refrigeration apparatus only when the associated air conditioning system fan is in operation.

These and other objects of the present invention will become apparent upon a study of the following specification and drawing of which;

Figure 1:
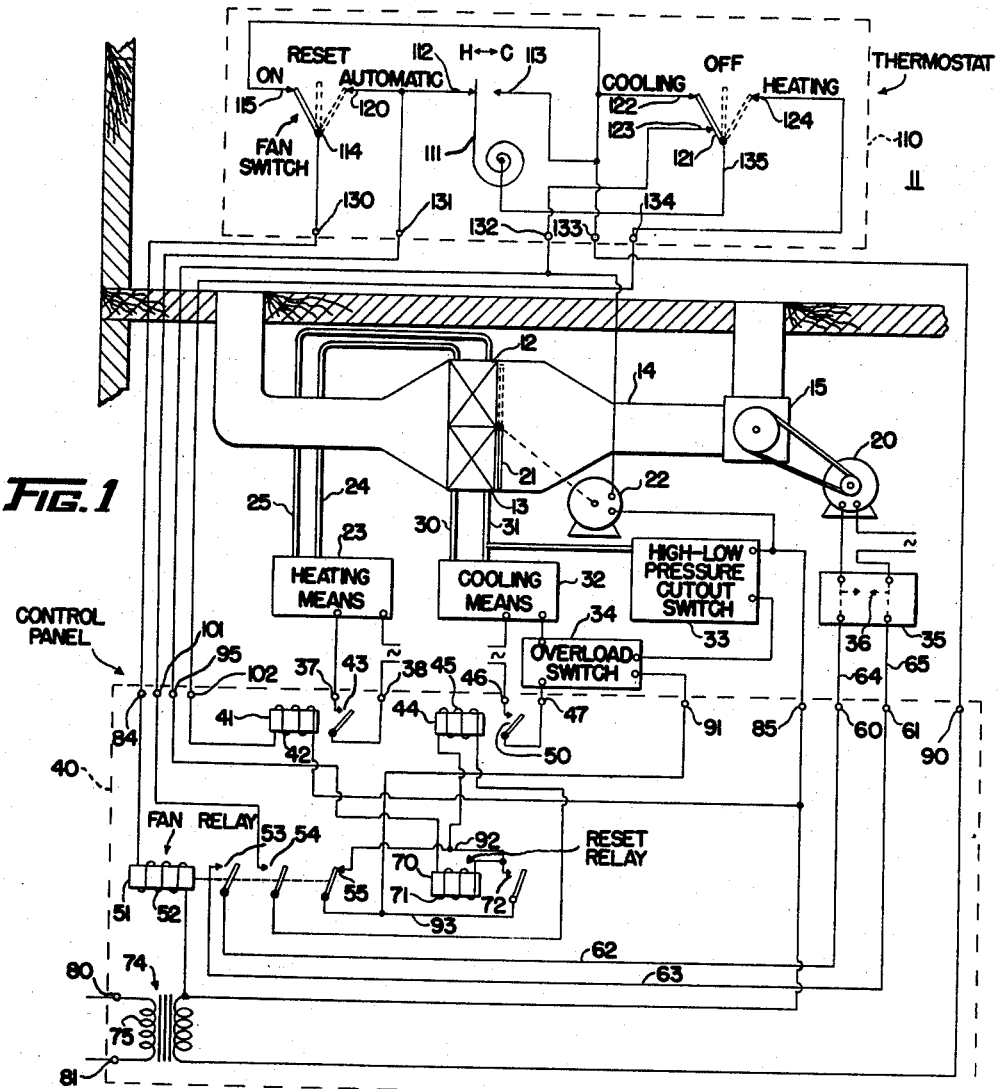
Figure 1 is a schematic representation of an air conditioning system and a control network thereof.

Referring to Figure 1, the present invention is shown for use in a typical air conditioning installation in which a space 11 can be selectively heated or cooled by the circulation of air through either a heating coil 12 or a cooling coil 13 located in a duct 14. Air from the space is circulated through duct 14 by an fan 15 driven by a conventional motor 20 connected thereto. Heat exchangers or coils 12 and 13 are selectively covered by a damper 21 positioned by an associated motor 22 depending upon whether heating or cooling is desired in space 11. As shown damper 21 is covering the cooling coil and air circulating through duct 14 will pass through heating coil 12.

Connected to coil 12 is a heating means 23 which might be a conventional hot water furnace for supplying hot water to coil 12 connected thereto by associated pipes 24 and 25. Coil 13 is connected by pipes 30 and 31 to a conventional cooling means 32 which might be a refrigeration apparatus or any such device supplying a cooling medium to coil 13 for cooling the air passing therethrough. Such a cooling means, especially refrigeration apparatus, normally has associated safety controls such as a high-low pressure cut off switch 33 which is responsive to the refrigerant pressure. Another safety means generally used is an overload switch 34 conencted in the energization circuit of the cooling means and is responsive to abnormal power demands which might occur when a failure exists in the cooling apparatus. Generally switches 33 and 34 are designed so that when the abnormal condition in the cooling apparatus occurs a circuit connected thereto will be opened.

Fan motor 20 is connected to a source of power through a conventional plenum control 35 which is responsive to the temperature near the heat exchanger or heating coil 12. Should the temperature of the coil rise above some predetermined value a switch 36 closes to provide operation of the fan.

A panel 40 which has a plurality of output terminals for connecting the various components of the cooling and heating system thereto is generally located in the vicinity of the components, for example in the basement. This panel contains a heating relay 41 having an energization winding 42 and a switch 43 which is closed upon energizing winding 42. Switch 43 is connected to terminals 37 and 38 of the panel. The heating means 23 power supply circuit is connected to terminals 37 and 38 so that when heating relay 41 is energized the heating means is placed in operation. A cooling relay 44 has an energization winding 45 and an associated switch 50 which is normally closed when winding 45 is energized. Switch 50 is connected to terminals 46 and 47 of the panel. The power supply circuit of the cooling means, including the responsive portion of the overload switch 34, is connected to terminals 46 and 47 so that upon energization of relay 44 the cooling means is placed in operation to supply a refrigerant to coil 13. A fan relay 51 has a winding 52 and three switches 53, 54, and 55. Switches 53 and 54 are normally closed when relay 51 is energized and switch 55 is normally closed when relay 51 is de-energized. Switch 53 is connected to terminals 60 and 61 of panel 40 by conductors 62 and 63. Terminals 60 and 61 are connected to control 35 by conductors 64 and 65, thus fan motor 20 is energized when either switch 36 or 53 is closed for heating or cooling, respectively.

A reset relay 70 has a winding 71 and a switch 72 which is normally closed when relay 70 is energized. A transformer 74 has a primary 75 connected to terminals 80 and 81 of the panel. These terminals are connected to an external source of power. The transformer has a secondary winding connected to panel terminals 85 and 90, respectively. The fan relay has its winding 52 connected between terminals 84 and 85 of the panel. Winding 71 of the reset relay is connected to terminal 95 of the panel at one end thereof and the other end is connected to the upper portion of switch 72 of the relay. The upper portion of switch 72 is connected by a conductor 92 to the upper portion of switch 55 of the fan relay. The lower portions of switches 72 and 55 are connected by a conductor 93 which is connected to terminal 91 of the panel.

Winding 45 of the cooling relay has one extremity connected to the upper portions of switches 55 and 72 and the other connected to terminal 101 of the panel through switch 54 of the fan relay. Winding 42 of the heating relay is connected between terminals 85 and 102 of the panel.

A thermostat 110 is located in space 11 and is responsive to the space temperature. Thermostat 110 might be of a conventional type presently on the market. The thermostat has a temperature responsive device 111 which in this instant is shown schematically as a bimetal for engaging selectively contacts 112 and 113. When bimetal 111 heats up it moves toward contact 112 and toward contact 113 on cooling, as indicated. A fan switch has a movable member 114 for selectively engaging contacts 115 and 120. Contacts 115 and 120 are conventionally known as the "on" and "automatic" contacts, respectively. A condition selecting switch for selecting either cooling or heating has a movable member 121 which engages contacts 122 and 123 when in the cooling position and a contact 124 when in the heating position. The thermostat has a plurality of terminals 130, 131, 132, 133, and 134 for connecting the thermostat to other equipment in air conditioning control systems of this type. Movable switch member 114 is connected to terminal 130. The "automatic" contact 120 and contact 112 are connected to terminal 131. Bimetal 111 and movable member 121 are interconnected to a conductor 135. "On" contact 115, contact 113, and contact 122 of the condition selector are connected to terminal 133. Contact 123 of the condition selector is connected to terminal 132. Heating contact 124 is connected to terminal 134.

In an air conditioning installation of the sort shown thermostat 110 and remotely located panel 40 would have the terminals thereof connected by conductors in the following manner. The terminals 130, 131, 132, 133, and 134 of the thermostat are connected to the terminals 84, 101, 95, 90, and 102 of the panel, respectively. Damper motor 22 is connected between terminal 132 of the thermostat and terminal 85 of the panel. The safety responsive safety switches 33 and 34 are connected in series between terminal 85 and 91 thus when one or both of the switches are open upon an abnormal condition existing in the cooling apparatus the energization circuit to the reset relay winding 71 and cooling relay 44 is broken.

*Operation of Figure one*

As shown the air conditioning control system is not in operation as power is not available to terminals 80 and 81 of the panel. The associated switches of the thermostat are so positioned that upon a restoration of the power the fan will run continuously as moveable member 114 engages the "on" contact 115. The condition selector switch is in the cooling position as moveable member 121 is engaging contacts 122 and 123. The temperature responsive device 111 senses a need for cooling and has moved to engage contact 112.

Let us assume that we connect a source of power to panel 40 as well as the heating means, cooling means, and fan, as indicated. Assuming that the safety switches 33 and 34 are closed which they normally would be as they are self resetting as soon as the abnormal or unsafe condition terminates. The reset relay winding 71 is energized through a circuit as traced from terminal 85, through safety switches 33 and 34, terminal 91, switch 55, winding 71, panel terminal 95, thermostat terminal 132, switch member 121, thermostat terminal 133, and back to terminal 90. At the same time the fan relay is energized through a circuit comprising terminal 85, winding 52, panel terminal 84, thermostat terminal 130, "on" contact 115, thermostat terminal 133, and back to the source of power through panel terminal 90. The fan relay and reset relay are so designed that the reset relay operates faster and its holding switch 72 closes soon enough to maintain energization of the reset relay even though switch 55 opens slightly thereafter when the fan relay is energized. Upon energization of the reset relay, cooling relay 44 is energized through a circuit traced as follows; from panel terminal 85, safety switches 33 and 34, panel terminal 91, reset switch 72, winding 45, fan switch 54, panel terminal 101, thermostat terminal 131, bimetal 111, moveable member 121, thermostat terminal 133, and back to the source of power through terminal 90 of the panel.

It is obvious by the aforementioned circuit that the cooling relay 44 could not be energized if the fan relay 51 were not energized as contact 54 would not be closed. This is an improvement over the prior art as formerly it was not necessry for the fan relay to be energized to provide operation of the cooling means. This improvement overcame one of the marked disadvantages of the prior art in that it does not allow the cooling relay 44 to cycle off of the safety switches 33 and 34 should there be a failure in the fan relay operation. Normally switches 33 and 34 are designed to shut down the system whenever an abnormal condition exists. By means of the reset circuit normal operation can only be restored by manually operating the reset switch. As the fan relay switch 55 is now used as the "reset switch," on a failure of the fan relay the reset circuit will be energized each time the safety switch is restored to its closed position; however, relay 44 is not energized as switch 54 is open.

Let us assume that some defect exists in the fan relay circuit, for example the wire connecting panel terminal 84 and thermostat terminal 130 becomes open. As switch 55 is closed the reset circuit is energized each time switches 33 and 34 are closed, but with the present invention relay 44 cannot be energized as switch 54 is open, therefore the cooling means cannot cycle off its safety switches.

With the cooling means in operation the space temperature would drop as air was moved through cooling coil 13. Damper 21 would be moved to the position in front of heating coil 12 upon the energization of motor 22 through the circuit from panel terminal 85, motor 22, thermostat terminal 132, switch member 121, terminal 133, and back to the transformer through panel terminal 90. Let us assume that an abnormal condition developed in the refrigeration system such as an overload and switch 34 opened. This would immediately close down the cooling apparatus by de-energizing relay 44 as well as the reset relay 70. As soon as the abnormal condition terminated the overload switch 34 would be restored to the closed position however the reset circuit would remain deenergized. To restore the system in an operating condition again the home owner need only move the movable member 114 of the fan switch to a position between contacts 115 and 120 to break the fan circuit momentarily. As soon as switch 55 closed the reset relay would again be energized and the fan could be restored to normal operation by moving member 114 to either the on or automatic position.

Upon a need for heating the condition selector switch is moved so that its movable member 121 engaged heating contact 124. Let us assume during the heating operation the fan switch was left in the "on" position as shown with the movable member 114 engaging contact 115, thus a continuous fan operation is provided. When the condition selector switch is in the off or heating positions the reset relay 70 is de-energized. After the termination of the heating period or season the condition selector switch would be moved so that the movable member 121 engaged contacts 122 and 123 as shown; however, since the reset relay is still de-energized it is necessary to break the fan relay circuit momentarily to provide the normal resetting of the reset circuit. Thus movable member 114 is moved away from the contact 115 and as soon as switch 55 closed the reset relay is energized. Should the fan selector switch be placed in the position so that the moveable member engaged contact 120 during the heating operation it is not necessary to reset the reset relay 70 when the system is transferred back to the cooling operation as the fan relay is de-energized. The operation of the fan is then accomplished by control 35.

*Operation of Figure two*

Figure 2:
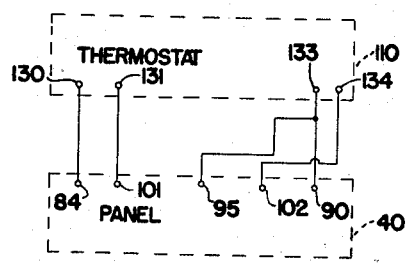
Figure 2 is a second embodiment of the invention.

As shown in Figure 2 the thermostat and panel are identical as those shown in Figure 1 except that the connection between the thermostat and panel is slightly modified. As shown in Figure 1 panel terminal 95 is connected to thermostat terminal 132. This connection is now broken and terminal 95 is now connected to terminal 133 as is terminal 90 of the panel. With the aforementioned change in the connection between the thermostat and panel of Figure 1 the operation of the system is as follows. Once the reset relay 70 is energized by switch 55 its holding switch 72 will maintain energization thereof regardless of whether the condition selector switch is moved from the heating or cooling position. The energization circuit for the reset relay 70 is as follows; transformer terminal 82, panel terminal 85, safety switches 33 and 34, panel terminal 91, holding switch 72, winding 71, panel terminal 95, and back to the transformer through panel terminal 90. With the reset relay energized continuously upon a transfer of the moveable member 121 to the cooling position to engage contact 122 and 123 operation of the cooling means 32 is initiated if the fan relay is energized regardless of the position of moveable member 114. Of course as previously mentioned should the fan relay be de-energized because of a fault in the fan relay circuit or should the moveable member 114 not be engaging either contact 115 or 120, switch 54 would be open and the cooling relay 44 could not be energized even though the reset circuit was in operation.

The circuit of Figure 2 has the advantage over the circuit as shown in Figure 1 in that it is not necessary to reset the reset circuit by de-energizing the fan relay should the fan switch be in the on position upon a transfer from heating to cooling. Of course, the circuit as shown in Figure 2 maintains continuous energization of the reset relay 70 during the heating and cooling periods or seasons, this may be objectionable in certain instances.

*Operation of Figure three*

Figure 3:
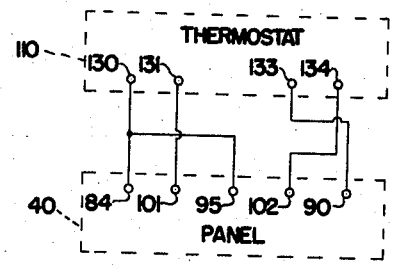
Figure 3 is a third embodiment of the invention.

As shown in Figure 3, the thermostat and panel are identical to those shown in Figure 1 except that the connection therebetween is slightly modified. Terminal 95 of the panel is now connected to terminal 130 of the thermostat. With the aforementioned change the operation of the system is as follows. Whenever the fan is energized through relay 51 reset relay 70 is energized. When the fan switch is in the "automatic" position such occurs each time the thermostat cooling contact 112 is energized. Should "on" or continuous fan operation be selected reset relay 70 is energized continuously with the exception of periods of power failure, or after a safety switch operation.

*Operation of Figure four*

Figure 4:
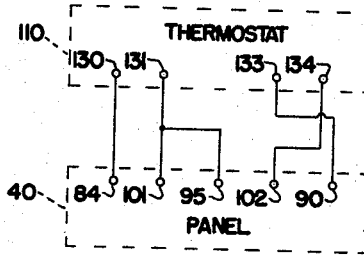
Figure 4 is a fourth embodiment of the invention.

As shown in Figure 4, the thermostat and panel are also identical to those shown in Figure 1 except that the connection therebetween is slightly modified. Terminal 95 of the panel is now connected to terminal 131 of the thermostat. With the selector switch in a position so that member 114 engages contact 120, each time there is a call for cooling by the thermostat there is a simultaneous energization of reset relay 70 and fan relay 51, followed shortly by energization of cooling relay 44. The reset relay, and the cooling relay are held in operation, as was before, by the holding contact or switch 72. It is apparent that should the fan selecting switch engage contact 115 for continuous fan operation, the device would need resetting by de-energizing the fan relay each time there was a need for cooling as determined by the temperature responsive device 111. This inconvenience could not be tolerated thus the present embodiment would primarily be used where only automatic fan operation could be obtained, that is, the energization of the fan relay each time there was a call for cooling by the thermostat.

While the present invention has been described as applied to one particular type of air conditioning apparatus it should be understood that the invention is to be limited only by the scope of the appended claims.

In which I claim:

1. In a control system for an air conditioning installation having a cooling coil receiving cooled medium from a refrigeration system and a fan for forcing air from a space to be cooled through the coil; first switch actuating means having a first and second normally open switches when said actuating device is de-energized and a third switch normally closed when said actuating device is de-energized; said first switch being adapted to control the energization of the fan, second switch actuating means having a normally open switch when said second means is de-energized; control means for controlling the operation of the refrigeration system; means responsive to abnormal operation conditions existing in the refrigeration system and having an open circuit upon the presence of an abnormal condition; connection means connecting said first switch of said first actuating means to control the operation of the fan so that when said first actuating means is energized said fan is energized; a source of power; means connecting said second actuating means to said source of power through a circuit comprising, said means responsive to abnormal conditions, and said third switch of said first actuating means and said normally open switch of said second actuating means, connected in parallel; and means connecting said control means to said source of power through a circuit comprising, said means responsive to abnormal operating conditions, said normally open switch of said second actuating means, and said second switch of said first actuating means whereby operation of said refrigeration system cannot be obtained even though a closed circuit exists in said abnormal condition responsive means until said first actuating means is energized and said fan is operating.

2. In control apparatus for an air conditioning installation, a heat exchanger, a cooling device for supplying a quantity of cooled medium to said exchanger, a fan for circulating air from a space through said heat exchanger to cool the space, first actuator means having a switch associated therewith, circuit means connecting said switch to control the operation of said cooling device, second actuator means having a first, second, and third switches associated therewith, said second switch being normally closed when said second actuator means is de-energized, said third switch being normally open when said second actuator means is de-energized, circuit means connecting said first switch of said second actuator to control the operation of said fan, condition responsive means responsive to the existence of abnormal conditions existing in the operation of said cooling device, said responsive means having a circuit which is opened upon the presence of said abnormal conditions, third actuator means having a switch associated therewith, said switch of said third actuator means being normally open when said third actuator means is de-energized, temperature responsive means associated with said space and providing a closed circuit when there is a need for cooling in said space, a source of power, a remotely located switch, circuit means connecting said second actuator means to said source of power through said remote switch to provide for selective energization of said second actuator means, circuit means connecting said first actuator means to said source of power through a circuit comprising, said switch of said third actuator means, said space temperature means, said third switch of said second actuator means, and said circuit of said abnormal condition responsive means; and circuit means connecting said third actuator means to said source of power through a circuit comprising, said circuit of said condition responsive means, and said second switch of said second actuator means or said switch of said third actuator means, said last mentioned switches being connected in parallel.

3. Control apparatus for controlling the operation of a cooling device furnishing a quantity of cooled medium to a heat exchanger, air from a space being circulated through the heat exchanger by a fan, the cooling device having a safety device providing an open circuit when abnormal operation conditions exist comprising; first relay means adapted to control the operation of the cooling device; second relay means adapted to control the operation of the fan, said second relay means having a first switch normally closed when said second relay means is de-energized and having a second switch normally open when said second relay means is de-energized; a remote control switch; third relay means having a switch normally open when said third relay means is de-energized; a source of power; first circuit means including said control switch connecting said second relay means to said source of power; second circuit means including said switch of said third relay means and said second switch of said second relay means for connecting said first relay means to said source of power whereby said cooling device cannot be energized unless said fan is energized, a normally closed switch of said second relay means and said switch of said third relay means being connected in parallel circuit, third circuit means adapted to connect a circuit comprising said third relay means, said parallel circuit, and said source of power to the circuit of the safety device, however before said third relay means can be energized through said last mentioned circuit said control switch must be opened to de-energize said second relay.

4. Control apparatus for controlling the operation of a cooling device and a circulation device circulating a medium through the cooling device, comprising, first actuator means adapted to control the operation of the cooling device, a source of power, second actuator means adapted to control the circulation device, said second actuator means having a normally open switch and a normally closed switch associated therewith, remote switch means, circuit means including said switch means selectively connecting said second actuator means to said source of power, a resettable actuator means having a switch and a holding circuit associated therewith, said holding circuit maintaining energization of said resettable actuator means when said resettable actuator means is energized, circuit means including said switch of said resettable actuator means and said normally open switch for connecting said first actuator to said source of power only when said second actuator is energized, and circuit means connecting said resettable actuator means to said source of power through said normally closed switch of said second actuator thus upon the de-energization of said second actuator means by opening said remote switch means said resettable actuator means is energized.

5. In control apparatus adapted to control the operation of cooling apparatus and a fan, first actuator means adapted to control the operation of the cooling apparatus, second actuator means adapted to control the fan, said second actuator means having a first switch normally closed when said second actuator means is de-energized and a second switch normally open when said actuator is de-energized, third actuator means having an energization circuit, a holding circuit, and a third switch for providing a closed circuit when said third actuator means is energized, said holding circuit maintaining energization of said energization circuit after it is initially energized, a source of power, a remotely located switch, first circuit means including said remote switch connecting said second actuator means to a source of power, second circuit means including said third switch and said normally open switch for connecting said first actuator means to said source of power whereby the cooling apparatus cannot be energized unless the fan is energized, and circuit means connecting said first switch in said energization circuit of said third actuator means to initiate energization thereof when said second actuator means is de-energized upon said remotely located switch being opened.

References Cited in the file of this patent

UNITED STATES PATENTS

| | | |
|---|---|---|
| 1,994,441 | Smith et al. | Mar. 12, 1935 |
| 2,188,877 | Kriechbaum | Jan. 30, 1940 |
| 2,383,811 | Miller | Aug. 28, 1945 |
| 2,389,073 | Newton | Nov. 13, 1945 |
| 2,440,700 | Rosche | May 4, 1948 |
| 2,561,067 | Newton | July 17, 1951 |
| 2,595,644 | Davis | May 6, 1952 |
| 2,884,767 | Ritter et al. | May 5, 1959 |